United States Patent [19]
Mayfield

[11] Patent Number: 5,972,277
[45] Date of Patent: Oct. 26, 1999

[54] METHODOLOGY FOR BLOW MOLDING CONTAINER WITH INTEGRAL COLLAPSIBLE SPOUT

[76] Inventor: Todd A Mayfield, 4745 Winding Rose Dr., Suwanee, Ga. 30024

[21] Appl. No.: 09/008,411

[22] Filed: Jan. 17, 1998

[51] Int. Cl.⁶ .................................................. B29C 49/00
[52] U.S. Cl. .......................... 264/506; 264/540; 425/525; 222/530
[58] Field of Search .................................... 264/506, 523, 264/536, 540; 425/525, 532; 222/529, 527, 530

[56] References Cited

U.S. PATENT DOCUMENTS

| | | | |
|---|---|---|---|
| 3,461,491 | 8/1969 | Hohmann et al. | 425/525 |
| 3,499,071 | 3/1970 | Hurst | 264/536 |
| 3,535,435 | 10/1970 | John | 264/536 |
| 3,579,620 | 5/1971 | Pettersson | 264/536 |
| 4,082,827 | 4/1978 | Chlystun | 222/529 |
| 5,133,481 | 7/1992 | Mayfield | 222/529 |
| 5,170,910 | 12/1992 | Hamm | 222/92 |
| 5,292,241 | 3/1994 | Fang et al. | 264/536 |
| 5,611,988 | 3/1997 | Mahajan | 264/523 |
| 5,647,516 | 7/1997 | Young et al. | 222/529 |

FOREIGN PATENT DOCUMENTS 4-314518  11/1992  Japan .

*Primary Examiner*—Catherine Timm

[57] ABSTRACT

Blow molding processes developed for producing plastic containers having an integral collapsible spout with self-latching bellow characteristics whereby, the centerline of integral collapsible spout (10) can be located either off centerline (34) or is centrally positioned (38) with containment body (32). In producing containers with integral collapsible spout (10) off centerline (34), the blow molding methodolgy requires parison flashing (12) to encapsulate integral collapsible spout (10) on both sides, along mold parting line (24), thereby, maintaining symmetry of the thickened cross-sectional wall portion, created by parison flashing (12). This technique improves the functionality of integral collapsible spout (10) and also allows it to maintain stability when collapsed to fully retracted position (14). Captive parison (36) is an alternate method that can be utilized when integral collapsible spout (10) is located in central position (38) of containment body (32). This method eliminates parison flashing (12) from self latching bellows sections (16), yet achieves the required functional characteristics when integral collapsible spout (10) is in fully retracted position (14).

2 Claims, 6 Drawing Sheets

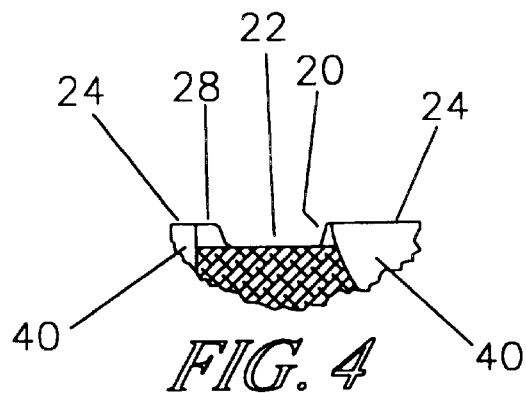
FIG. 4
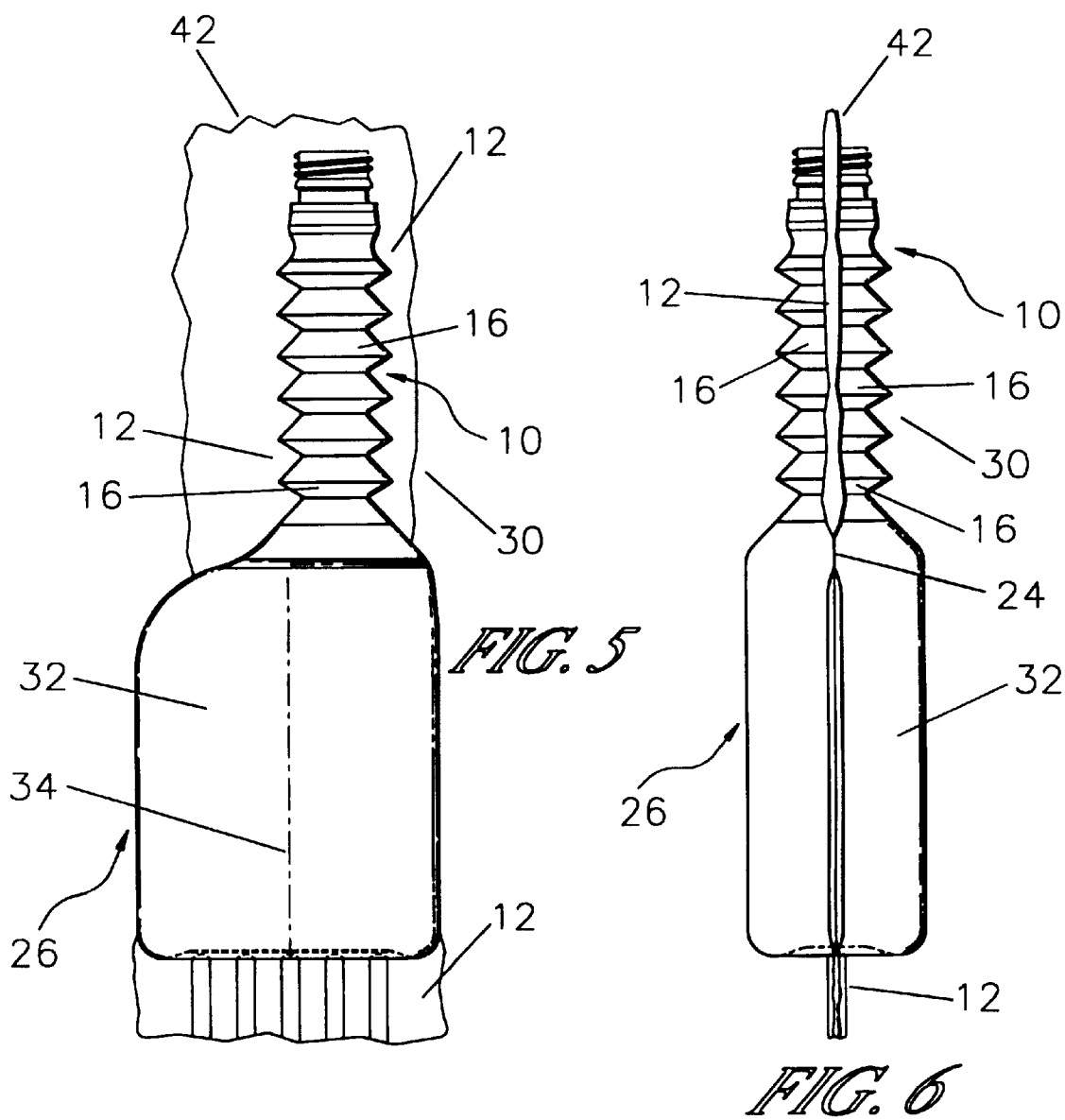
FIG. 5
FIG. 6

METHODOLOGY FOR BLOW MOLDING CONTAINER WITH INTEGRAL COLLAPSIBLE SPOUT

CROSS REFERENCES TO RELATED APPLICATIONS

BACKGROUND

1. Field of Invention

The invention relates to technology associated with blow molding practices used for manufacturing plastic bottles and specifically, containers having an integral collapsible spout, formed into a portion of container body.

2. Description of Prior Art

There are certain unique blow molding methods and techniques used during the manufacturing process to successfully produce a container with a functional, integrally molded collapsible spout. When the centerline of the integral collapsible spout is located off centerline of the containment body or if an integral gripping means is positioned next to said spout, parison flashing must occur on both sides of integral collapsible spout. In doing so, this stabilizes the internal material stresses associated with the thickened cross-sectional wall that is created from flashing along the mold line of the integral collapsible spout. Thus, equal symmetry is maintained and the integral collapsible spout can maintain stability when collapsed to the fully retracted position for filling and packaging needs. The pinch surfaces of the mold blocks have been modified to help reduce the thickened cross-sectional material along the flute profile of each self latching bellows section. This is further improved by relieving the pinch surfaces and increasing the depth of gutter flash pockets to help move excess material away from the mold parting line. Thereby, creating a more uniform wall thickness throughout the spout.

An alternate method is sometimes preferred when the integral collapsible spout is positioned centrally with the containment body, allowing the parison to be captive within the minor dimension of said spout and extend through the center of containment body during the blow molding process. Thus, when utilizing this method, flashing is eliminated from the plurality of self latching bellow sections comprising integral collapsible spout.

OBJECTS AND ADVANTAGES

Accordingly, several objects and advantages of the present invention implement certain blow molding techniques during the manufacturing process, coupled with modifications to specific areas of the mold block sections.

Generally, the blow molding process of the present invention comprises the steps of providing an elongated, tubular, formable plastic material, called a parison, between open mold blocks; subsequently moving said mold blocks together until said mold blocks seat, thus forming a mold parting line; entrapping said parison between the defined cavities in said mold blocks; and thereafter injecting pressurized air into the interior of said parison, inflating and forcing the parison to the confines of said defined cavities in said mold blocks, thereby forming the desired blow molded container.

More specifically, on containers and bottles having the centerline of said integral collapsible spout offset from centerline of containment body, said parison must be aligned and be positioned so that it encapsulates the outermost extremities of each collapsible, self latching bellows section. Hence, creating parison flashing on both sides of said spout. In doing so, material will be distributed evenly throughout the integral collapsible spout and symmetry will be maintained along the mold parting line. To improve material thickening in the mold parting line area of integral collapsible spout, the pinch surfaces associated with the flute profile in each self latching bellows section have been modified from general mold and tooling practices. Therefore, the cross-sectional wall of these pinch surfaces are steeper, taller and more narrow than normal. The outer base wall of these pinch surfaces terminate into the gutter flash pockets located on both sides of integral collapsible spout, of said mold blocks. The depth of the gutter flash pockets have also been increased to reduce material thickening, allowing a maximum amount of material to pull away from said mold parting line of integral collapsible spout.

However, on containers having said integral collapsible spout centrally positioned with the containment body, parison flashing can be eliminated from the self latching bellow sections. To achieve this, said parison is processed in a captive method within the minor dimension of the integral collapsible spout, and extends through the containment body, proximal to the centerline of integral collapsible spout and containment body, during said blow molding process. This blow molding technique provides the same results as producing parison flashing on both sides and also allows said integral collapsible spout to maintain stability when in the fully retracted position.

Still further objects and advantages of these methods will become apparent from a consideration of the ensuing description and accompanying drawings.

BRIEF DESCRIPTION OF THE DRAWINGS

FIG. 4 is a cross-sectional view showing a portion of gutter flash pocket area, standard pinch surfaces and modified pinch surfaces of the flute profile that comprises each bellows section of each mold block.

FIG. 5 is a a front side view of an alternate container design having an integral collapsible spout shown in fully extended position, off centerline and with flashing on both sides of integral spout.

FIG. 6 is a right end view of FIG. 5 and shows parison flashing located along mold parting line of container.

Figure 1:
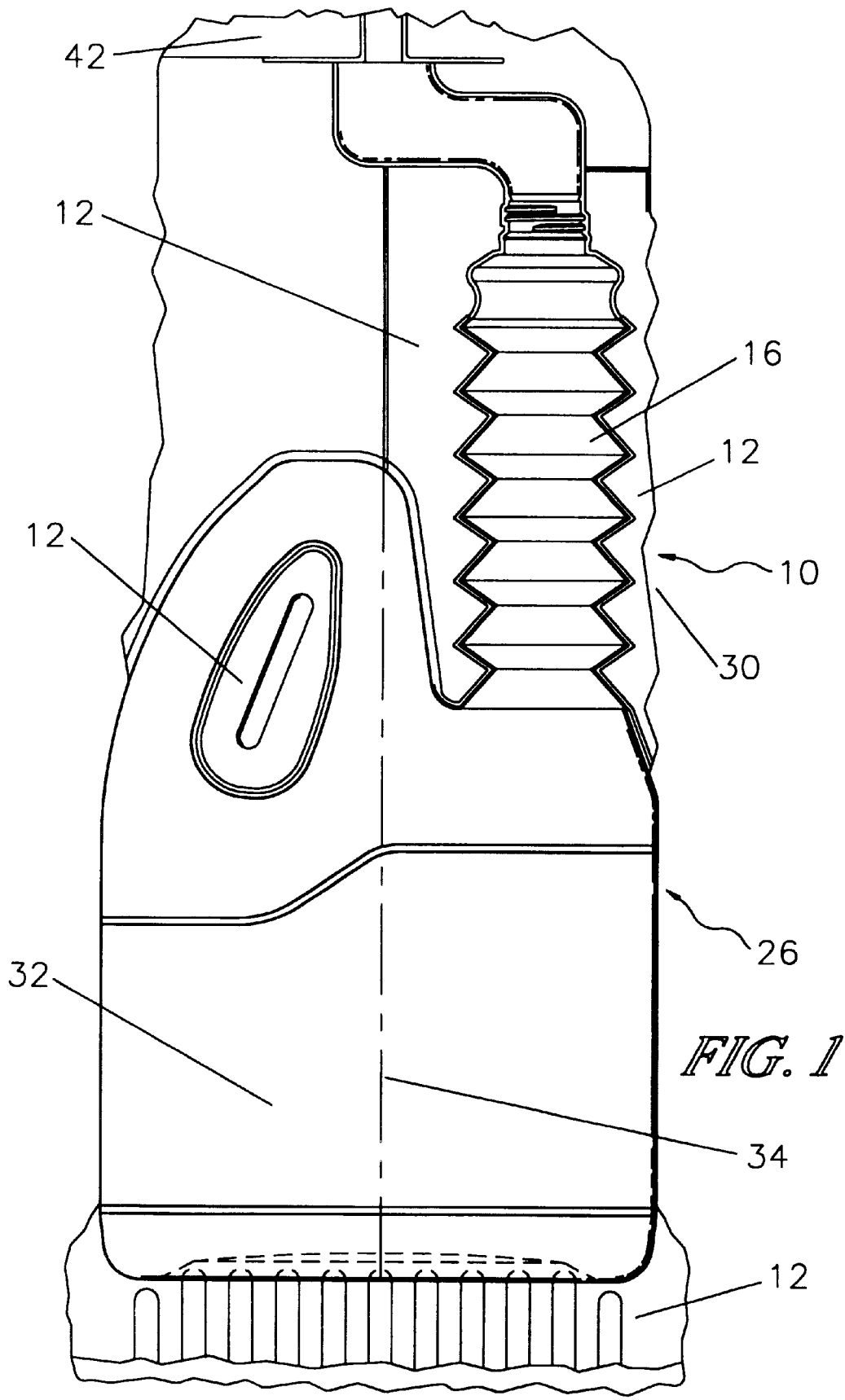
FIG. 1 is a front side view of a flashed container, with integral collapsible spout positioned off centerline from containment body and is shown with spout in extended position to illustrate how parison flashing is required on both sides of spout, when located off centerline from containment body.

REFERENCE NUMERALS 10 integral collapsible spout
12 parison flashing
14 fully retracted position
16 self latching bellow sections
18 mold blocks
20 modified pinch surfaces
22 gutter flash pocket
24 mold parting line
26 container
28 standard pinch surfaces
30 fully extended position
32 containment body
34 centerline
36 captive parison
38 central position
40 mold cavity
42 parison

SUMMARY

Blow molding methods that utilize specific mold technology, for producing plastic containers or bottles, suitable for holding liquids or other pourable substances therein and dispensing such liquids or pourable substances therefrom, through an integral collapsible spout, comprising a plurality of self latching bellow sections, having a sealable opening at one end and a base, joined to and formed into a portion of containment body; whereby the blow molding method comprises the steps of providing an elongated, tubular, formable material, called a parison, between open mold blocks; subsequently moving said mold blocks together until said mold blocks seat, thus forming a mold parting line; entrapping said parison between the defined cavities in said mold blocks; and thereafter injecting pressurized air into the interior of said parison, inflating and forcing the parison to the confines of said defined cavities in said mold blocks, thereby forming said containers or bottles.

PREFERRED EMBODIMENT—DESCRIPTION

Figure 3:
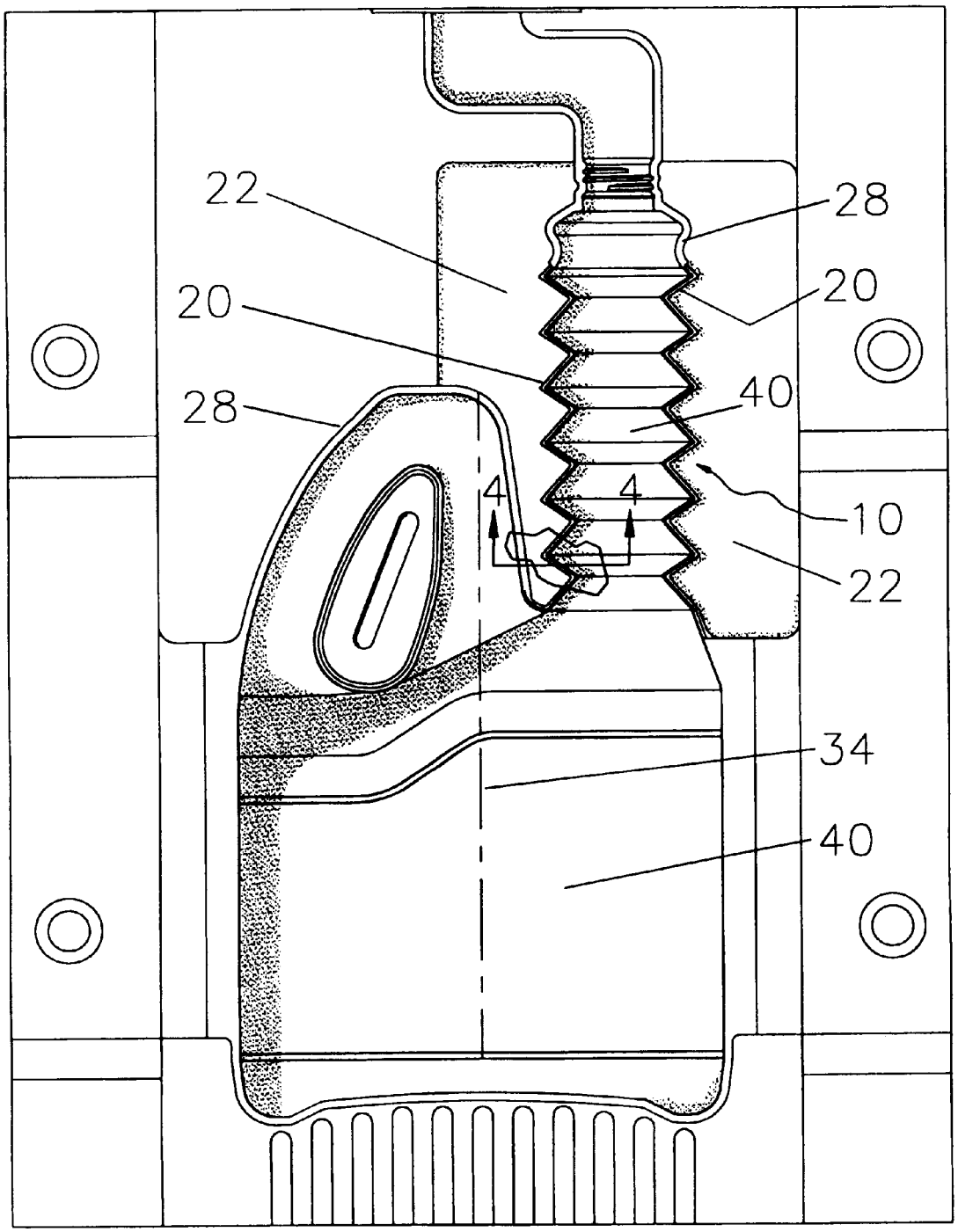
FIG. 3 is a front side view of said mold block sections for blow molding one version of a container having an integral collapsible spout, as shown in FIG. 1 and FIG. 2 and illustrates specific pinch surfaces and gutter flash areas of said mold block that are modified to minimize a thickened material condition, proximal to said mold parting line in each bellows section.
Figure 7:
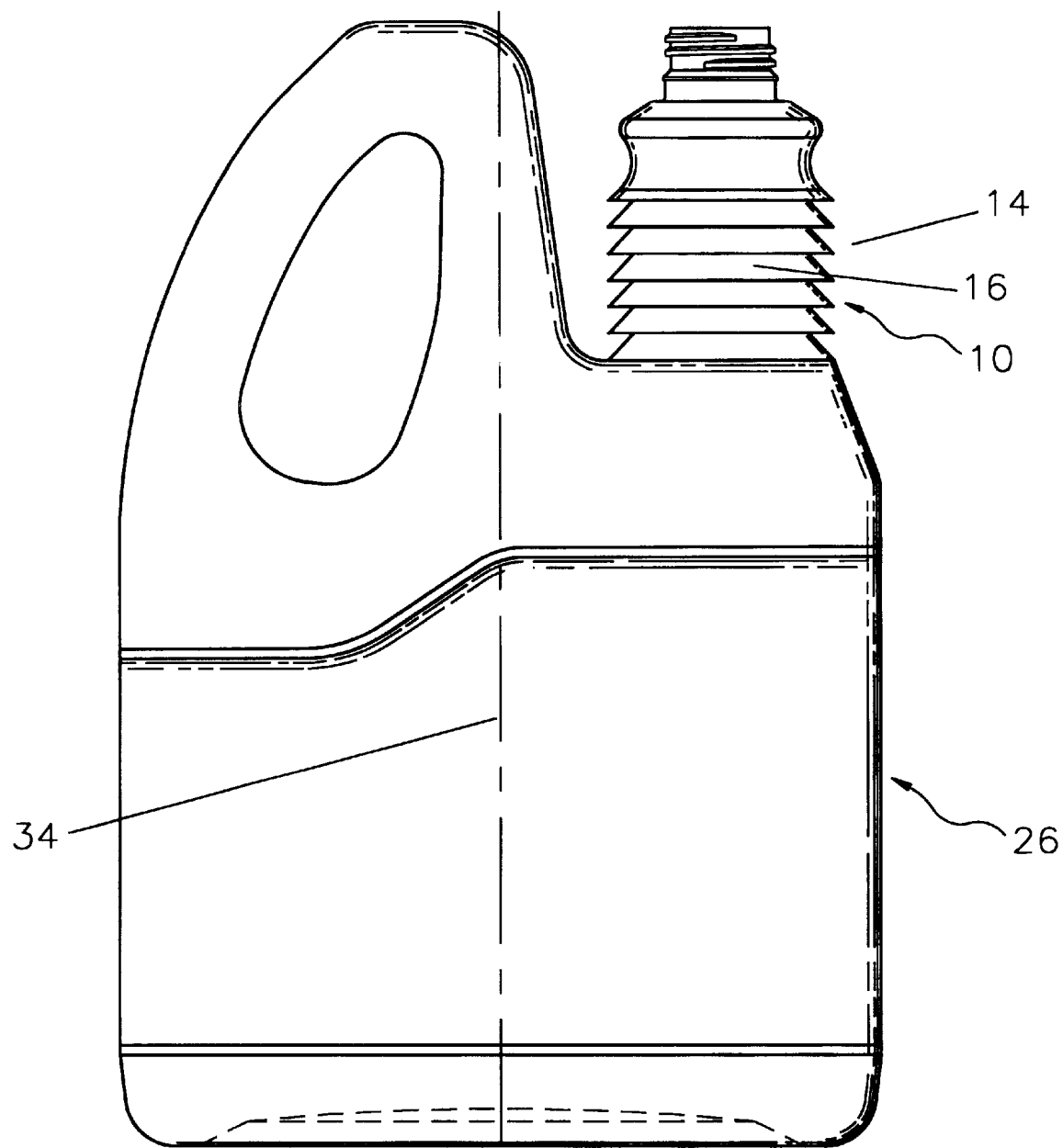
FIG. 7 is a front side view of the container shown in FIG. 1 that has been de-flashed and demonstrates the improved stability of said integral collapsible spout in its fully retracted position.
Figure 8:
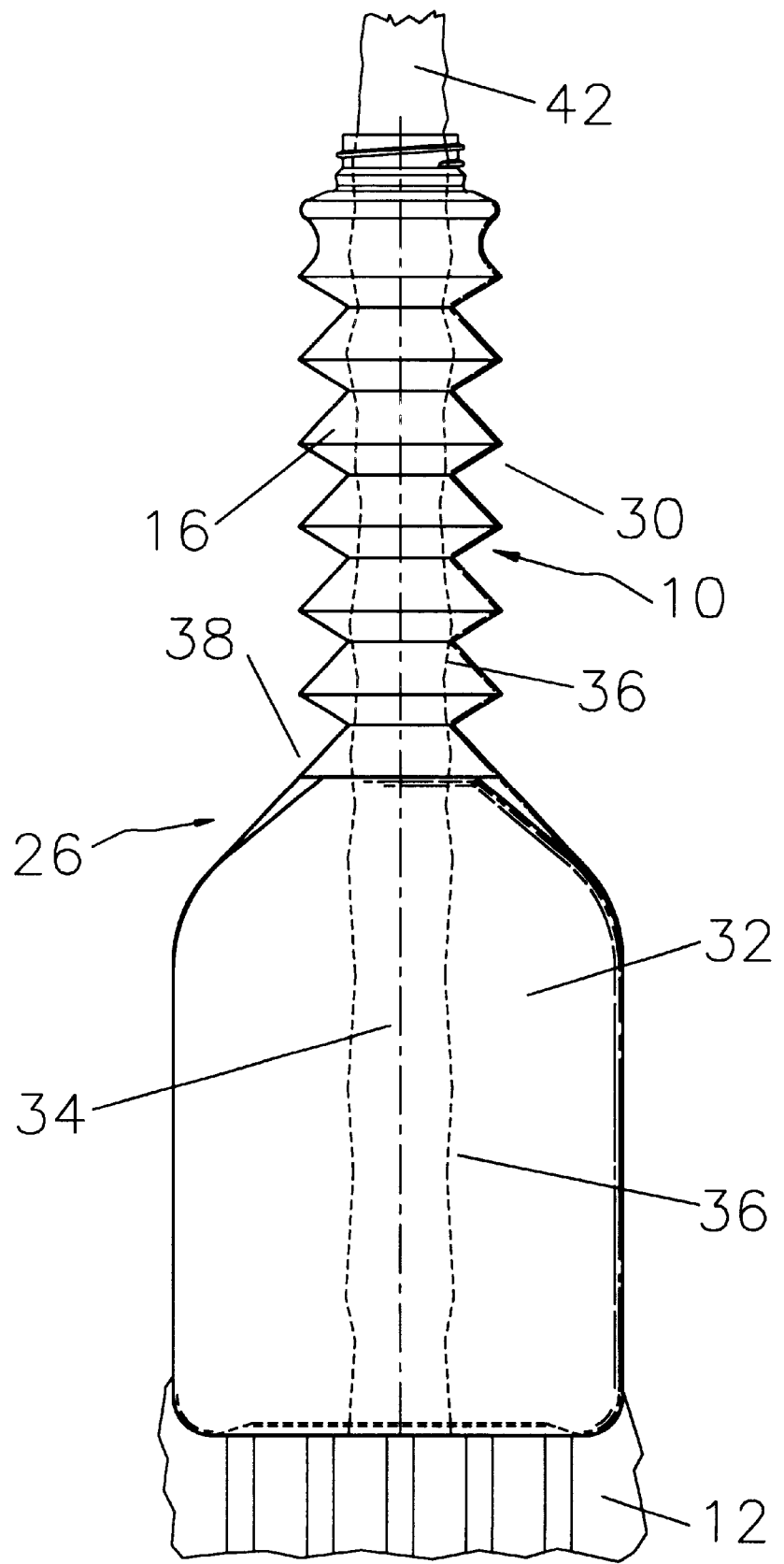
FIG. 8 is a a front side view of yet another container design whereby the parison is shown using a captive method and is positioned through the interior of integral collapsible spout, proximal to the centerline of containment body, and illustrates the plurality of self latching bellow sections without flashing.

Methods for producing blow molded containers and specifically for containers having an integral collapsible, retractable spout, comprising a plurality of self latching bellow sections. FIG. 1 shows parison 42 for producing container 26 after being blow molded with parison flashing 12 surrounding integral collapsible spout 10, and is noticeably in fully extended position 30, illustrating integral collapsible spout 10 off centerline 34 of containment body 32. FIG. 7 shows integral collapsible spout 10 in fully retracted position 14 with parison flashing 12, de-flashed and removed. When positioned in fully retracted position 14, it is important that integral collapsible spout 10 maintain stability and not tilt off center line, particularly for filling and packaging needs. To achieve these functional characteristics, parison flashing 12 must encapsulate the outer most extremities of each self latching bellow sections 16 of integral collapsible spout 10, parallel to mold parting line 24. FIG. 8 shows an alternate method for achieving the above functional characteristics, whereby, parison 42 is processed as captive parison 36, and is positioned within the minor dimension of integral collapsible spout 10, extending through containment body 32 when integral collapsible spout 10 is located in central position 38, with containment body 32, thereby, eliminating parison flashing 12 from self latching bellow sections 16. FIG. 3 shows one of said mold blocks 18 and mold cavity 40, of container 26 with standard pinch surfaces 28, modified pinch surfaces 20 and gutter flash pocket 22. In mold blocks 18, the cross-sectional area of modified pinch surfaces 20 that are associated with the flute profile in each self latching bellow sections 16, have been altered to help improve material thickening along mold parting line 24 of integral collapsible spout 10. The depth of gutter flash pocket 22 has been increased in mold blocks 18 and provides additional space for parison flashing 12. This allows more material to flow out of mold cavity 40 and into gutter flash pocket 22, producing the preferred functional characteristics of integral collapsible spout 10. FIG. 4 shows a cross-sectional view of modified pinch surfaces 20, gutter flash pocket 22 and standard pinch surfaces 28.

PREFERRED EMBODIMENT—OPERATION

Operation of the present invention is identified through the steps of blow molding and will be described further with reference to FIG. 1–FIG. 8.

The blow molding process of the present invention comprises the steps of providing an elongated, tubular, formable plastic material, referred to as parison 42, and is generally extruded through a machine and distributed between open mold blocks 18; subsequently moving mold blocks 18 together until mold blocks 18 make contact and fully seat, forming mold parting line 24; entrapping parison 42 between mold cavities 40 of mold blocks 18; and thereafter injecting pressurized air into the interior of parison 42, inflating and forcing parison 42 to the confines of mold cavities 40 in mold blocks 18, thereby forming the desired container 26.

Figure 2:
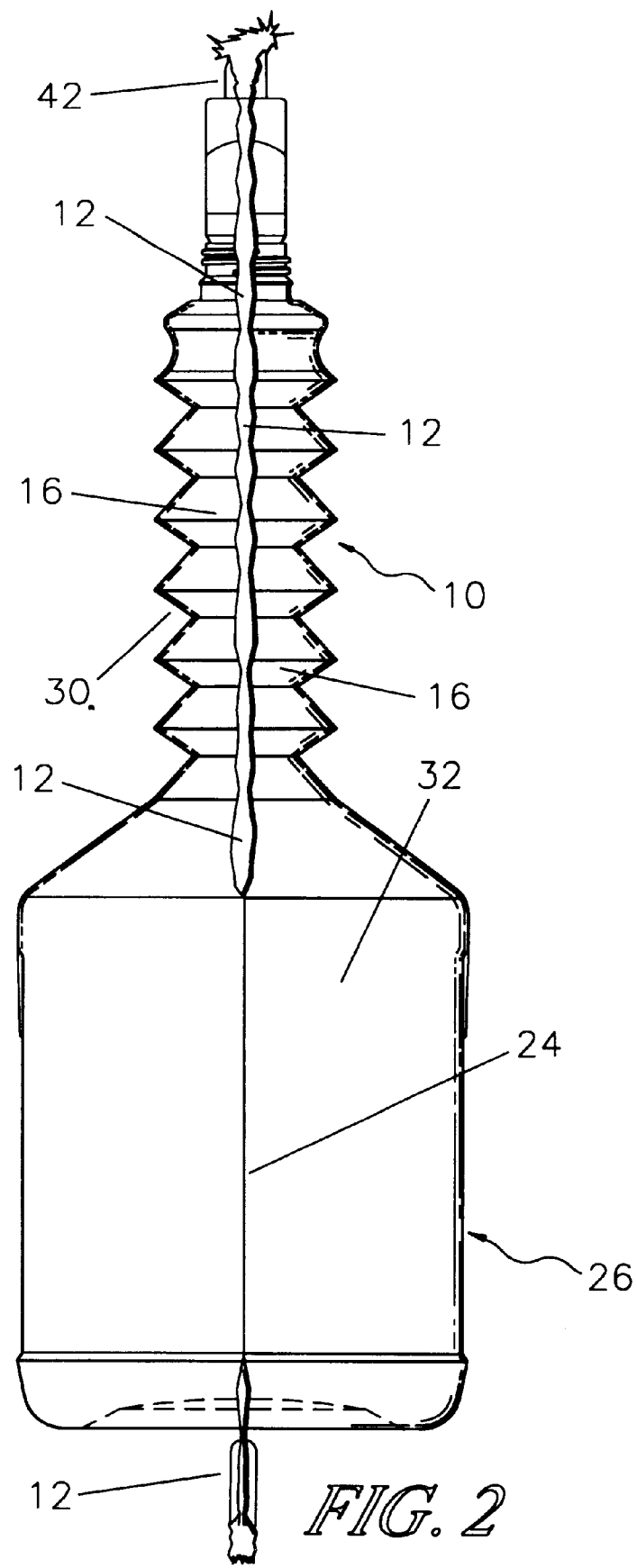
FIG. 2 is a right end view of the container shown in FIG. 1 and shows an approximate thickness of the flashing, parallel to the mold line.

FIG. 1 shows how parison flashing 12 encapsulates integral collapsible spout 10, in fully extended position 30, on both sides, parallel with mold parting line 24 and is also shown in FIG. 2 and FIG. 6. During said blow molding process, parison flashing 12 creates a thickened cross-sectional wall portion along mold parting line 24. This particular blow molding methodology is specifically applied when integral collapsible spout 10 is shifted off centerline 34 of containment body 32. The method is further illustrated on an alternate container version shown in FIG. 5 and FIG. 6. On containers of this type when parison flashing 12 does not encapsulate both sides of integral collapsible spout 10, symmetry of material stresses can not be maintained and integral collapsible spout 10 becomes unstable when in fully retracted position 14. Therefore on containers of this type, optimum performance of integral collapsible spout 10 is achieved during the blow molding process, when parison flashing 12 is produced on both sides of integral collapsible spout 10. However, an alternate method shown in FIG. 8 shows integral collapsible spout 10 in central position 38, of containment body 32, whereby, parison 42 is utilized as captive parison 36, eliminating parison flashing 12 from self latching bellows sections 16. The method utilizing parison 42 as captive parison 36 achieves the same functional characteristics as flashing on both sides of integral collapsible spout 10 but requires integral collapsible spout 10 to be in central position 38 of containment body 32 for effective processing. FIG. 3 shows one of mold blocks 18 of container 26 and illustrates how gutter flash pocket 22 and standard pinch surfaces 28 have been altered from general mold practices to help improve material thickening conditions along mold parting line 24 of integral collapsible spout 10. The depth of gutter flash pocket 22 has been increased surrounding integral collapsible spout 10 and the flute profile in each self latching bellow section 16 incorporates modified pinch surfaces 20, that are sharper and have more relief than standard pinch surfaces 28. This allows material to move outwardly away from mold parting line 24, thus reducing material thickening in integral collapsible spout 10 and provides the functional characteristics needed for integral collapsible spout 10 to maintain stability when in fully retracted position 14, as shown in FIG. 7. FIG. 4 further illustrates the operation of gutter flash pocket 22 and shows the differences between standard pinch surfaces 28 and modified pinch surfaces 20.

Conclusions, Ramifications, and Scope

Accordingly, it can be seen that the present invention has developed effective methods for blow molding plastic containers and bottles having an integral collapsible, retractable and flexible spout with self latching bellow characteristics, whereby, the integral collapsible spout will maintain stability when in a fully retracted position. This blow molding methodology is created for containers having both the centerline of the integral collapsible spout located off-centerline from the containment body and for bottles having the centerline of integral collapsible spout centrally positioned with the containment body.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

What is claimed is:

1. A blow molding process for forming a container or bottle having an integral collapsible spout and a containment body, the integral collapsible spout being positioned off the center line of said containment body and having a plurality of self latching bellow sections providing the means for said integral collapsible spout to maintain a retracted or collapsed position, and said blow molding process comprising the steps of:

a) providing an elongated, tubular, formable parison between mold blocks;

b) subsequently moving said mold blocks together until said mold blocks seat and establish a mold parting line, said mold blocks defining a mold cavity having a containment body mold cavity portion and a collapsible spout mold cavity portion defining said integral collapsible spout in an extended configuration, said mold blocks defining gutter flash pockets adjacent said collapsible spout mold cavity portion, c) entrapping said parison between said mold blocks, so that said parison is pinched along said mold parting line to produce parison flashing on both sides of integral collapsible spout along said mold parting line, d) thereafter injecting pressurized air or other gas into the interior of said parison, inflating and forcing said parison to the confines of said mold cavity in said mold blocks, e) thereby forming said container or bottle having an integral collapsible spout.

2. The blow molding process described in claim 1 whereby said integral collapsible spout comprises:

a) a plurality of self latching collapsible bellow sections, providing the means for said integral collapsible spout to maintain stability in said retracted or collapsed position, thereby preventing said integral collapsible spout from tilting when in said retracted or collapsed position, b) said integral collapsible spout having a distal end with sealable opening and a base joined to and formed into a portion of containment body, c) whereby said containers or bottles are suitable for holding liquids or other pourable substances therein and dispensing said liquids or said pourable substances therefrom, through said integral collapsible spout.

* * * * *